Patented Feb. 8, 1927.

1,617,311

UNITED STATES PATENT OFFICE.

JAMES ELIOT BOOGE, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF PRODUCING LIGHT-RESISTANT LITHOPONE.

No Drawing. Application filed October 22, 1923, Serial No. 669,950. Renewed April 30, 1926.

This invention relates to the production of lithopone and comprises calcination of crude lithopone containing substantially no chloride or only a small amount of chloride, in a reactive or slightly oxidizing atmosphere, followed by treatment of the calcined lithopone with an acid or acid reagent.

The main object of this invention is the production of a light resistant lithopone of superior whiteness and low zinc oxide content.

Lithopone is a white pigment consisting usually of approximately equi-molecular quantities of barium sulfate and zinc sulfide. It is customarily made by the mutual precipitation of these two compounds from solutions of barium sulfide and zinc sulfate prepared by methods well known in the art. The precipitate which is known as raw or crude lithopone is filtered, dried, calcined at red heat, quenched in water, ground to a high degree of fineness, washed with water, blued, filtered, dried, disintegrated and packed. Lithopone has a variety of uses as a pigment; for example, in the manufacture of paints, oil cloth, linoleum, window shade cloth, and in the rubber industry.

Most varieties of lithopone as heretofore manufactured possess the undesirable property of darkening to a grey or black color when exposed to direct sunlight. For this reason the use of lithopone in paints especially has been largely limited to interior purposes. However, comparatively recent improvements in the processes employed have resulted in the manufacture of lithopones which are more or less resistant to the action of sunlight. The appearance on the market of such lithopones promises to appreciably extend the field of usefulness of this valuable pigment.

The advent of light resistant lithopones comes as the result of a large amount of research dating back over a number of years. Numerous references are found in the literature and a large number of patents have been taken out describing processes purporting to result in the production of light resistant lithopone. Relatively few of the processes described, however, are operative on a commercial scale.

The processes which have found commercial application may be divided into two classes: (1) those depending upon the addition at some point in the processes of manufacture of some material, usually alkaline in nature, designed to decrease the light sensitiveness, and (2) those in which the crude lithopone is precipitated and calcined in the substantial absence or in the presence of only a small amount of chloride. The latter method of obtaining light resistance is in more general use in the manufacture of modern light resistant lithopones.

When crude lithopone substantially free from chloride or containing only a small amount of chloride (say less than an amount corresponding to 0.2% of chlorine) is calcined in an atmosphere containing oxygen, an appreciable oxidation of zinc sulfide to zinc oxide occurs; also the pigment becomes decidedly yellow in color. When a somewhat greater quantity of chloride is present in the crude lithopone (say more than an amount corresponding to 0.5% of chlorine), the material may be calcined in muffles from which air is only partially excluded. Under these circumstances the presence of the chloride to a large extent prevents the yellowing mentioned above—and a product of excellent white color is obtainable. The presence of the chloride during the calcination, however, as mentioned above, renders the pigment sensitive to light.

In order to calcine substantially chloride-free crude lithopone (thereby gaining light resistance) and at the same time obtain a product of satisfactory color, it has heretofore been necessary to conduct the calcination in the entire absence of air. To meet this requirement several types of calcining furnaces have been developed by different lithopone manufactures.

I have discovered, however, that the undesirable yellow color possessed by the product obtained when crude lithopone of low chloride content is calcined with the incomplete exclusion of air, is destroyed by treatment of the calcined lithopone with an acid or acid reagent; also that although a slight decrease in light resistance appears to occur due to the calcination in an oxidizing atmosphere, the treatment with acid has the effect of improving this property to about the same value as is obtained by calcination of the same crude lithopone in a non-oxidizing atmosphere. The invention which I claim, therefore, is the process of calcining crude lithopone of low chloride content with incomplete exclusion of air (i. e., in the presence of gases containing small amounts of free oxygen) followed by a treatment of the calcined product with an acid or acid reagent (as described in detail below) whereby a light resistant lithopone of excellent whiteness is finally produced.

In carrying out the above invention on a commercial scale I have found it convenient to employ a continuous kiln equipped for burning either gas or oil. This apparatus may be operated either with a slight deficiency of air in the combustion chamber, whereby a reducing or non-oxidizing atmosphere is maintained in contact with the lithopone undergoing calcination—or a slight excess of air over that required to completely burn the gas or oil used as fuel may, according to the present invention, be employed. The latter method of operation is obviously more econimical of fuel and in fact I estimate that from 5 to 10% less fuel is required than when a non-oxidizing atmosphere containing 1–2% CO is maintained.

Obviously the maximum of heat economy is reached when just enough air is admitted to the combustion chamber to completely burn the fuel used. Since in actual operation this is impossible of realization for any considerable period of time and since no appreciable loss of heat results when a slight excess of oxygen is admitted, it is preferable, in order to actually realize the maximum heat value of the fuel used, to maintain a slight excess of oxygen. Although in practice an average of 0.5 to 1.5% oxygen can be quite readily maintained, the percentage of oxygen can increase to 3 or 4% without serious injury to the lithopone, if said lithopone is subsequently treated with acid in accordance with my invention. The acid treatment is not as effective, however, if it has been preceded by a calcination of the lithopone with this higher percentage of oxygen. The proportion of oxygen in the combustion gases may be readily controlled by analysis of the gas from time to time or by suitable instruments which automatically indicate the oxygen content of the gas.

It will be understood, however, that the present invention is not limited to calcination in the above described type of apparatus—nor to any particular type of furnace or muffle but that calcination of crude lithopone of low chloride content in any suitable furnace or muffle from which air is not completely excluded, followed by treatment with an acid or acid reagent as described below, properly comes within the scope of this invention.

The treatment with acid is preferably made after the lithopone has been ground, although I do not wish to limit myself to treatment at this stage of manufacture inasmuch as treatment before or during grinding or during quenching results in similar improvement in the color of the product.

The following example will serve as an illustration of the preferred method of carrying out the treatment with acid: The crude lithophone of low chloride content having been calcined in the presence of more or less oxygen, quenched and ground to a suitable fineness, is available in the form of a water slurry composed of about one part lithophone to from two to fifty parts water. To this slurry, contained in a suitable vat or tub, sulfuric acid is added until the slurry shows an acid reaction to methyl red indicator. During the addition of the acid the slurry is agitated vigorously. The acid is preferably used in the form of a water solution containing about 30% $H_2SO_4$, although higher or lower concentrations than this may, of course, be used, and I do not wish to limit myself to the use of acid of any particular range of concentration. The amount of acid required is usually about 1 lb. of 100% $H_2SO_4$ per 100 lbs. of lithophone, although the quantity will vary with different batches of lithophone according to the amount of basic materials contained therein and the degree of oxidation which it has undergone during calcination.

The treatment with acid is followed by thorough washing of the lithophone with water to remove substantially all free acid. To remove final traces of acid which are washed out with difficulty, the slurry is finally neutralized with sodium hydroxide, sodium carbonate or other suitable alkaline material. The lithophone is then blued, pressed, dried, and disintegrated as usual.

It will be understood that the treatment with acid may also be carried out in equipment which operates continuously, the acid being run continuously into a stream of the lithophone slurry and the acid treatment followed by continuous countercurrent washing with water.

The use of a large excess of acid over that required to yield an acid reaction to methyl red is to be avoided inasmuch as no further benefit is derived therefrom and such a procedure is wasteful and a greater amount of washing is required to remove the excess acid from the lithopone. It will be understood, however, that moderate excesses of acid do no harm and that other indicators than methyl red may be used; for example, brom thymol blue, methyl orange or brom phenol blue.

It will be understood that other acids than sulfuric may be used; also that acid salts such as sodium acid sulfate or any material which when dissolved in water shows an acid reaction (as, for example, aluminum sulfate) will likewise be effective in producing the desired improvement in color. It will likewise be understood that smaller amounts of acid than specified above may be used and that some advantage will result therefrom although not to the full extent obtainable by the preferred method of treatment as described. I wish to make it understood, however, that my invention includes treatment with any amount of acid, either more or less than required to produce an acid reaction with methyl red indicator, although the amount of acid required to just produce an acid reaction with methyl red has been found by experience to be preferred.

As a result of my investigations, I have determined that very slight oxidizing influences, such as described above, during the calcination of lithopone result in the formation of appreciable amounts of zinc oxide which can be readily detected in the calcined product by testing with 5% acetic acid. In fact the lithopone produced according to my invention will, when quenched in water, usually have an acetic acid (5%) soluble zinc content between 0.5 and 1.5%, calculated as zinc oxide. (Lithopone calcined in a non-oxidizing atmosphere usually contains less than 0.5% zinc oxide.) When the lithopone which has been calcined in a slightly oxidizing atmosphere, is treated with an acid or an acid reagent as described above, the acetic acid soluble zinc content (i. e., zinc oxide) is reduced to substantially less than 0.5% (ZnO) and in fact the zinc oxide content of the final product is usually between 0.1 and 0.3%. The presence of an appreciable amount of zinc oxide (say more than 0.5%) in finished lithopone is usually regarded as objectionable. Therefore, although the zinc oxide content of the lithopone manufactured according to the present invention, rises to an objectionable extent during calcination, the treatment with acid as described, reduces the zinc oxide content of the finished product to a satisfactory value—which, in fact, is lower than is usually obtained when lithopone is calcined in a non-oxidizing atmosphere.

The lithopone produced according to the present invention with maximum heating efficiency is therefore characterized by its resistance to sunlight, superior whiteness and unusually low zinc oxide content. Other properties such as tinting strength and oil absorption which can be varied as desired by changing temperature of calcination, etc., are substantially the same as are obtained when the same crude lithopone is calcined in a non-oxidizing atmosphere. Due to the thorough washing with water which follows the treatment with acid, the product of this invention is also characterized by an especially low water soluble content—usually in the neighborhood of 0.1%, and rarely more than 0.2%.

I claim:

1. The process of making a light-resistant lithopone which comprises calcining a crude lithopone substantially free of chloride, in an atmosphere containing a small percentage only of free oxygen, and then treating the calcined product with a water solution of a substance having an acid reaction.

2. The process of making a light resistant lithopone which comprises calcining a crude lithopone containing not more than about 0.2% of chlorine in the form of a chloride, in an atmosphere containing a small amount, but less than 4%, of oxygen, and then treating the calcined product with a water solution of a substance having an acid reaction.

3. The process of making a light-resistant lithopone which comprises calcining a crude lithopone containing not more than 0.2% of chlorine in the form of a chloride, in an atmosphere containing between about 0.5 and 1.5% of oxygen, and then treating the calcined product with a water solution of a substance having an acid reaction.

4. A process according to claim 1, in which the acid solution is added to a slurry of the lithopone until the slurry shows an acid reaction to methyl red indicator.

5. A process according to claim 1 in which the acid solution used is sulphuric acid of about 30% strength.

6. A process according to claim 1, in which the acid treatment is followed by washing with water to remove at least a large proportion of the water-soluble salts present.

7. A process according to claim 1, in which the acid treatment is followed by washing with water to remove acid and water-soluble salts, and then by washing with an alkaline solution to remove last traces of acid.

8. The process of making light-resistant lithopone which comprises calcining a crude lithopone substantially free of chloride, at a temperature of between about 650 and 900° C. in an atmosphere containing a small percentage only of free oxygen, and then treating the lithopone after calcination with an acid to increase the whiteness thereof.

9. The process of making light-resistant lithopone which comprises calcining a crude lithopone containing not more than about 0.2% of combined chlorine, at a temperature of between about 650 and 900° C. in an atmosphere containing a small amount, but less than 4%, of free oxygen, and then treating the lithopone after calcination with an acid to increase the whiteness thereof.

10. The process of making light-resistant lithopone which comprises calcining a crude lithopone containing not more than 0.2% of combined chlorine, at a temperature of between about 650° and 900° C., in an atmosphere containing from about 0.5% to 1.5% of free oxygen, and then treating the lithopone after calcination with an acid to increase the whiteness thereof.

11. The process of making a light-resistant lithopone which comprises calcining a crude lithopone containing less than 0.1% of combined chlorine, in an atmosphere having a small percentage only of free oxygen, and then treating the calcined product with a water solution of a substance having an acid reaction.

12. The process of making a light-resistant lithopone which comprises calcining crude lithopone containing less than 0.1% of combined chlorine by bringing into contact therewith hot products of combustion containing free oxygen in an amount not exceeding 4%, said combustion products being formed by efficient burning of a gas consisting essentially of CO and H, quenching the calcined lithopone and subjecting the quenched product to the action of an acid.

13. The process of making a light-resistant lithopone which comprises calcining crude lithopone containing less than 0.1% of combined chlorine at a temperature between about 650 and 900° C., by bringing into contact therewith hot products of combustion containing free oxygen in an amount not exceeding 4%, said combustion products being formed by efficient burning of a gas consisting essentially of CO and H, quenching the calcined lithopone and subjecting the quenched product to the action of an acid.

14. A process according to claim 11 in which the crude lithopone contains less than 0.03% of combined chlorine.

15. A process according to claim 12 in which the crude lithopone contains less than 0.03% of combined chlorine.

16. A process according to claim 12 in which the calcination temperature is between 650 and 900° C. and the combustion gases have from 0.5 to 1.5% of free oxygen.

17. The process of making lithopone which comprises calcining a substantially chloride-free crude lithopone in a slightly oxidizing atmosphere, and treating the calcined product with an acid substantially as described.

18. The process of making lithopone which comprises calcining a crude lithopone of low chloride content in a reactive atmosphere whereby the zinc oxide content of the lithopone is appreciably increased, and reducing the zinc oxide content of the calcined lithopone to less than 0.5% by treating it with a reagent whose aqueous solutions is distinctly acid.

19. A process according to claim 18 in which the crude lithopone contains not more than 0.2% of combined chlorine.

20. A process according to claim 18 in which the crude lithopone contains not more than 0.1% of combined chlorine.

21. A process according to claim 18 in which the crude lithopone contains not more than 0.03% of combined chlorine.

22. A process according to claim 18 in which the combined chlorine in the crude lithopone is less than 0.1%, and the reactive atmosphere contains less than 3% of free oxygen.

23. A process according to claim 18 in which the acid treatment is followed by washing first with water and then with an alkaline solution to eliminate acid.

24. A process according to claim 18 in which the crude lithopone contains less than 0.1% of combined chlorine, and is calcined at a temperature between 650 and 900° C.

25. The process of making lithopone which comprises calcining a substantially chloride-free crude lithopone by contacting therewith the hot products of combustion of a combustible gas or oil, said combustion products having a temperature between 750 and 900° C., whereby the zinc oxide content of the lithopone is appreciably increased, and substantially reducing the zinc oxide content, and increasing the whiteness, of the calcined lithopone by washing it with an acid solution.

26. A process according to claim 2 in which the acid solution is added to a slurry of the lithopone until the slurry shows an acid reaction to methyl red indicator.

27. A process according to claim 3 in which the acid solution is added to a slurry of the lithopone until the slurry shows an acid reaction to methyl red indicator.

28. A process according to claim 2, in which the acid solution used is sulphuric acid of about 30% strength.

29. A process according to claim 3, in which the acid solution used is sulphuric acid of about 30% strength.

30. A process according to claim 2, in which the acid treatment is followed by washing with water to remove at least a large proportion of the water-soluble salts present.

31. A process according to claim 3, in which the acid treatment is followed by washing with water to remove at least a large proportion of the water-soluble salts present.

32. A process according to claim 2, in which the acid treatment is followed by washing with water to remove acid and water-soluble salts, and then by washing with an alkaline solution to remove last traces of acid.

33. A process according to claim 3, in which the acid treatment is followed by washing with water to remove acid and water-soluble salts, and then by washing with an alkaline solution to remove last traces of acid.

In testimony whereof I affix my signature.

JAMES ELIOT BOOGE.